Dec. 13, 1966 EIZO SUGIMOTO ET AL 3,291,696
FUEL ELEMENT FOR HIGH TEMPERATURE AND HIGH POWER
DENSITY NUCLEAR REACTOR

Filed June 21, 1963 2 Sheets-Sheet 1

INVENTORS
EIZO SUGIMOTO, ATSUYOSHI MORISHIMA, AKIRA TACHIBANA and SHIGERU YASUKAWA
BY E. M. Squire
their ATTORNEY

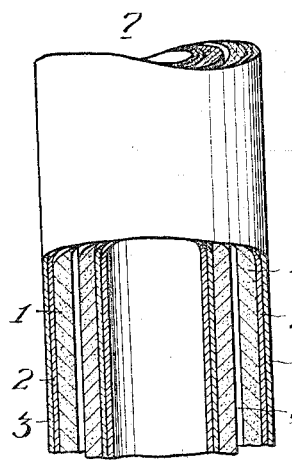
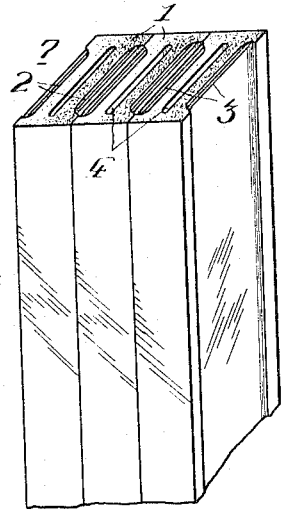
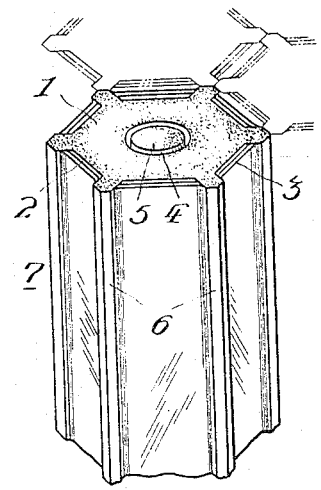
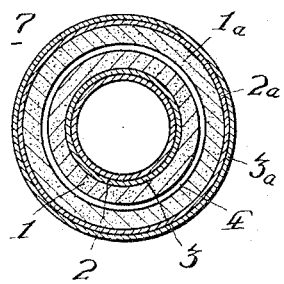
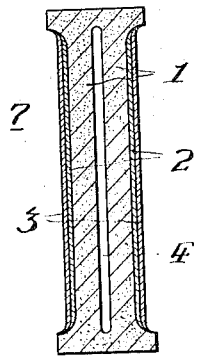
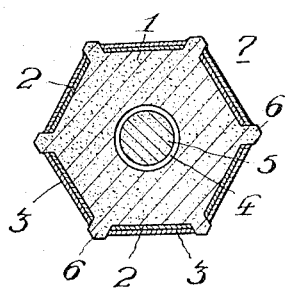
INVENTORS
EIZO SUGIMOTO, ATSUYOSHI MORISHIMA, AKIRA TACHIBANA and SHIGERU YASUKAWA
BY E.M. Squire
their ATTORNEY

United States Patent Office 3,291,696
Patented Dec. 13, 1966

3,291,696
FUEL ELEMENT FOR HIGH TEMPERATURE AND HIGH POWER DENSITY NUCLEAR REACTOR
Eizo Sugimoto, Atsuyoshi Morishima, Akira Tachibana, and Sigeru Yasukawa, Tokai-mura, Naka-gun, Japan, assignors to Nihon Genshiryoku Kenkyujo, Tokyo, Japan, a specific juridical corporation of Japan
Filed June 21, 1963, Ser. No. 289,530
Claims priority, application Japan, Sept. 21, 1962, 37/40,796
5 Claims. (Cl. 176—68)

The present invention relates to a fuel element for a nuclear reactor suitable for high temperature and high power density performance.

A hitherto known fuel element for a high temperature gas cooled reactor is such that graphite fuel comprising uranium dispersed uniformly into graphite is inserted into a graphite sheath. The graphite is an excellent moderator, resistant against high temperature (3000° C. or more) and therefore suitable for a fuel element in a high temperature gas cooled reactor. Ceramic material such as beryllium oxide is likewise suitable for use in a fuel element for a high temperature nuclear reactor.

However, as graphite and ceramic material are weak in mechanical strength as compared with metallic material, such a graphite or ceramic sheath is about 50–80 mm. in diameter and 8–12 mm. in thickness. It does not satisfy the requirements for a fuel element as thin as a metal clad fuel element of the light water type. Therefore, as the power density increases and the heat flux becomes high, the temperature difference between inside and outside of such a sheath will rise to 200°–300° C. Thereby the thermal stress within the sheath becomes large and will cause destruction of the sheath. Thus the power density is restricted (mean density at core about 15 w./cc.) and a high power density (50–70 w./cc.) as in the light water type is not obtainable. As the power density becomes large (mean density at core about 15 w./cc.), the temperature differences between the internal and external sheath surfaces, across a gap between the sheath and fuel element, and also between internal and external portions of the fuel element, become large and if the internal temperature is assumed to be about 1700° C., the temperature of a coolant cannot be increased by more than 750°–800° C. If the temperature of the coolant is to be raised further, it is necessary to reduce the power density.

The present invention provides an improved fuel element for operation at a high temperature (about 1500° C.) and high power density (mean density at core 50–100 w./cc.) and which avoids the disadvantages mentioned above.

In a graphite moderated enriched fueled reactor, the atomic number ratio of carbon to U 233 or 235 is preferred to be 2,000–10,000 or thereabout. It would be about 100–500 in weight ratio and if a fuel material is applied in the form or uranium carbide, it would be about 50–2,500 in volume ratio. If it is added by Th (or U 238) as fertile material of ten times as much as uranium, the ratio of graphite and fuel material uranium-thorium, $UC_2$–$ThC_2$ and uranium carbide would become 45–225 in volume. Therefore, a graphite rod of about 50 mm. in diameter, may well provide a suitable atomic number ratio, if a layer of fuel material of 0.3–0.2 mm. in thickness is coated on the surface.

In order that the present invention may be more clearly understood, reference will now be made to the accompanying drawings which illustrate seven embodiments of a fuel element for a nuclear reactor.

In the drawings:

FIGURES 9 and 10 are an elevation partly in vertical section and a cross-sectional view, respectively, of a double cylindrical element.

FIGURES 11 and 12 are a perspective view and cross-sectional view, respectively, of a flat type fuel element, similar to the elements of FIGS. 5 and 6, but with the fuel coating applied externally to the individual element.

FIGURES 13 and 14 are a perspective view and a cross-sectional view, respectively, showing a heat resisting material of hexagonal pillar type.

In each figure, 1 is a heat resistant base member formed of graphite or beryllium oxide, 2 a thin covering or coating consisting essentially of the fuel material, 3 a carbon, carbide, ceramic or other thin and at least partially gas impermeable covering layer, 4 a gap, 5 a graphite filler element, and 7 a gaseous coolant surrounding the fuel element.

Figure 1:
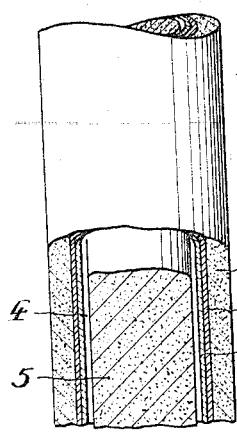
FIGURES 1 and 2 are an elevation partly in vertical section and a cross section, respectively, of an embodiment of a fuel element utilizing heat resisting material in the form of cylinder.
Figure 2:
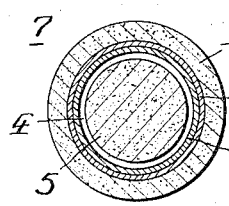

FIGURES 1 and 2 show an embodiment where a coating of fuel material 2 is applied to the internal surface of an impermeable carbon cylinder 1 the external surface of which is in direct contact with a gaseous coolant 7. Thereby a temperature difference of about 200° C. between the gap 4 and coolant 7 is obtained and heat is removed in a manner different from that employed in a hitherto known device containing a dispersion type fuel element in a sheath. Further, as the uranium thorium, $UC_2$–$ThC_2$ and uranium carbide of the coating 2 has comparatively good thermal conductivity (about one half that of graphite), and the coating 2 is about 0.3 mm. in thickness, no appreciable difference in temperature is caused by the fuel covering 2. Thus, the temperature of fuel layer 2 can be reduced below 400–500° C. to provide a fuel material stable in quality. If the uranium-thorium carbide is stable up to 1,700° C., even when a temperature difference between coolant and sheath surface are taken into consideration, it is possible to obtain a coolant temperature of 1,000–1,200° C. at 15–20 w./cc. of mean power density at the core.

If, assuming the cylinder 1 to be formed of an impermeable graphite, purge gas is streamed in the gap 4 to remove gaseous nuclear fission products continuously, the leaking of radioactivity to a primary coolant system using the coolant 7 is prevented, and it is also possible to prevent linkage to such an extent that safe operation of a nuclear reactor is obtained. If the covering layer 3 is omitted, it is possible to remove fission products such as Xe 135 very rapidly, and these fission products, being large in thermal neutron absorption, may economize neutrons. If necessary, a thin covering of proper permeability such as glass-like carbon, pyrolitic carbon, carbide and the like are covered over the fuel coating 2 to control the leakage rate of the fission products and thus make it possible to lighten the load carried by the purification system.

Figure 3:
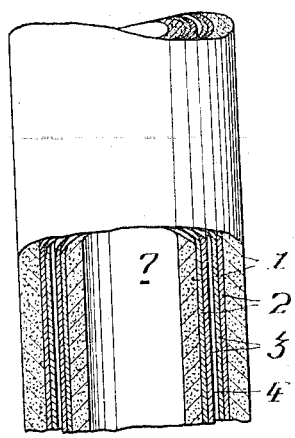
FIGURES 3 and 4 are an elevation partly in vertical section and a cross section, respectively, showing a modified embodiment.
Figure 5:
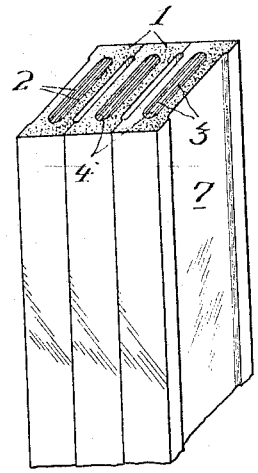
FIGURE 5 is a perspective view showing an embodiment utilizing a series of flat fuel elements placed side by side.
Figure 4:
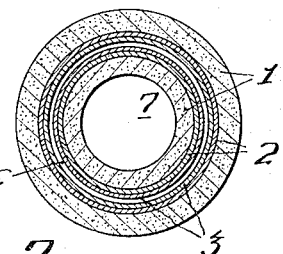
Figure 6:
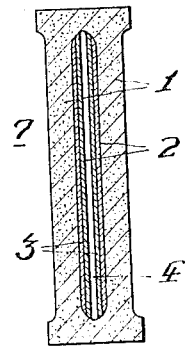
FIGURE 6 is an enlarged transverse sectional view of an individual one of the series of fuel elements shown in FIG. 5.

In the embodiment of FIGURES 1 and 2, it may be possible to raise the operating temperature, but the thermal stress which is borne by the graphite cylinder would be same, so that it does not contribute to raise the power density. However, in such a construction as graphite cylinder 1 covered with fuel coating 2, the graphite cylinder 1 will work as a moderator and at the same time as a construction material, so that construction will be more free than when a dispersion type fuel element is inserted. As in FIGURES 3 and 4, it is possible to provide a double concentric cylindrical fuel element layer 2 and as shown in FIGURES 5 and 6, the fuel layer 2 is made flat for increasing the cooling area, thus to decrease thermal stress so that power density is also increased.

Figure 7:
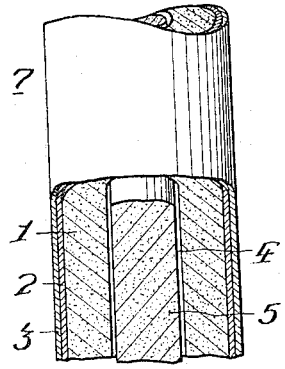
FIGURES 7 and 8 are an elevation partly in vertical section and a cross-sectional view, respectively, showing a cylindrical element formed of heat resisting material with an external coating of fuel.
Figure 8:
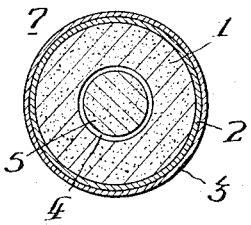

FIGURES 7 and 8 illustrate an embodiment wherein a fuel element coating 2 is applied to the external or coolant side of graphite cylinder 1. In order to prevent contamination by radioactivity of the primary cooling system, the graphite cylinder 1 should be of a material having proper gas permeability and over the fuel layer 2, a protective layer 3 of impermeable glass-like carbon, pyrolitic carbon, carbide or beryllium and other ceramic material may be applied. Thus it is possible to avoid the accumulation of pressure caused by gaseous fission products. The gaseous fission products leak into the gap 4 through the gas permeable cylinder 1 and are delivered into the purification system (not shown).

When the fuel layer 2 is applied exteriorly of the cylinder 1, adjacent to the coolant 7, the interior of the fuel layer 2 becomes constant in temperature and will not be subjected to thermal stress. Thus, there is no limitation of power density owing to thermal stress. (The internal temperature will rise slightly owing to gamma heat and neutron moderation, but this will not produce an appreciable temperature difference.) Therefore, the wall thickness of cylinder 1 may be made as thick as the mechanical strength requires. High heat conductivity is not required. At the time of manufacturing, only the external surface of the cylinder must be precisely finished, and dimensional accuracy of the inside diameter need not be taken into consideration. As graphite has both a large specific heat and very good thermal conductivity at high temperature, even though the fuel layer 2 may be lacking in uniformity and thereby heating may become non-uniform to some extent, local overheating is avoided. Therefore, the manufacture of a long fuel element for a large size reactor is facilitated.

As the fuel covering 2 and impermeable covering 3 are so thin as under 1 mm., the temperature difference occurring from this difference is small. Even if the temperature difference between a surface of a fuel element and a coolant is taken into consideration, it is possible to obtain a coolant temperature of about 1500° C. without regard to power density limitations.

FIGURES 9 and 10 represent an improvement over FIGURES 7 and 8 by the provision of an increased cooling area. Fuel layers 2 and 2a are applied externally and internally to coaxial graphite cylinders 1 and 1a, respectively.

In the embodiment of FIGURES 11 and 12, a hollow graphite plate 1 has fuel layers 2 applied to its flat external surfaces. Covering layers 3 extend over the fuel layers 2.

The embodiment of FIGURES 13 and 14 is similar to the embodiments of FIGURES 7 to 12. As it is possible that the flat fuel layer 2 and the impermeable covering 3 may often be mechanically dislodged in handling, there are provided vertical outwardly projecting ribs 6 which extend beyond the layers 2 and 3 to protect them from contact during handling.

Although the use of graphite has been described above, beryllium oxide is also a good moderator and excellent in heat resistance, and a cylinder or plate of beryllium oxide, covered with a thin layer of fuel material (in this case uranium oxide or thorium oxide), and further covered impermeably by a ceramic material such as a beryllium oxide or aluminium oxide, may be used with similar effects.

The fuel element of the present invention exhibits the following advantages:

Resonance escape probability P is much better because Th (or U 238) is localized in space, and probability of resonance neutron reaction with Th atoms is much reduced. This is specifically significant if the fertile material is Th. As the half-life of Pa 233 produced from (n, $\gamma$) reaction of Th is long and resonance absorption is specially large, so that in the system in which neutron flux is high and probability P is low, the loss incurred from resonance absorption in the production of Th→U 233 is usually large, and this point has been much improved. For above reasons:

(1) As resonance absorption caused by the fertile material is reduced and the loss of neutrons owing to Pa 233 decreases, the critical mass is reduced, or much more Th can be loaded in the core.

(2) Decrease in resonance absorption of fertile material makes the conversion ratio worse, but in the case of Th, loss of Pa 233 decreases at the same time, so that conversion ratio does not change much. If the amount of fertile material is increased by the amount of decrease of resonance absorption, the fuel consumption is slightly augmented.

In the cases of embodiments shown in FIGURES 7 through 14, the moderator is placed in the fuel, so that the average neutron temperature rises. This means an improvement of thermal neutron utilization. So far as the temperature coefficient is concerned, the doppler effect and the effect of temperature rise of the neutrons has been improved.

What is claimed is:

1. A fuel element for use in a nuclear reactor of the gas-cooled type, said fuel element comprising: an elongated hollow cylindrical core member formed of gas-impermeable material selected from the group consisting of graphite and beryllium oxide; a fuel layer consisting essentially of fissionable material extending over the internal surface of said core member, said core member being free from said fissionable material; and a gaseous coolant in contact with the external surface of said core member; a gas-permeable covering layer extending over said fuel layer in contact therewith, said fuel layer being sandwiched between said core member and said covering layer; and a cylindrical filler member coaxial with said core member and spaced from said covering layer to define a gap therebetween for the circulation of a purge gas to remove gaseous fission products from said fuel element.

2. A fuel element for use in a nuclear reactor of the gas-cooled type, said fuel element comprising: inner and outer elongated coaxial hollow cylindrical core members each formed of gas-impermeable material selected from the group consisting of graphite and beryllium oxide; spaced directly confronting covering layers of gas-permeable material located between the external surface of said inner member and the internal surface of said outer member, the spacer between said covering layers defining a gap for the circulation of a purge gas; a first fuel layer sandwiched between the internal surface of said outer member and one of said covering layers; a second fuel layer sandwiched between the external surface of said inner member and the other of said covering layers; and a gaseous coolant in contact with the internal surface of said inner member.

3. A fuel element for use in a nuclear reactor of the gas-cooled type, said fuel element comprising: an elongated core member of generally rectangular elongated cross-sectional configuration, said configuration defining two flat parallel lateral surfaces at opposite sides of said core member, said configuration including ridges which have flat contact surfaces formed thereon, said contact surfaces being parallel to said lateral surfaces and uniformly spaced outwardly thereof whereby a plurality of said fuel elements may be arranged side by side with said contact surfaces in engagement and the lateral surfaces of adjacent core members in spaced parallel directly confronting relationship, said core member having an axially extending central passage formed therein defining two confronting flat inner surfaces parallel to each other and to said lateral surfaces of said core member, said core member being formed of gas-impermeable material selected from the group consisting of graphite and beryllium oxide; two fuel layers each covering one of said inner surfaces, said fuel layers defining a passage for a purge gas therebetween; and a gaseous coolant in contact with the confronting ones of said lateral surfaces when a plurality of said core members are arranged side by side with the adjacent contact surfaces of adjacent core members in engagement with each other.

4. A fuel element according to claim 3, further comprising two covering layers of gas permeable material each overlying one of said fuel layers, said passage for purge gas being defined between said covering layers.

5. A fuel element for use in a nuclear reactor of the gas-cooled type, said fuel element comprising: an elongated hollow cylindrical core member formed of material selected from the group consisting of graphite and beryllium oxide, said core member being gas-permeable; a fuel layer consisting essentially of fissionable material covering the external lateral surface of said core member, said core member being free from said fissionable material; a covering layer of gas-impermeable material extending over said fuel layer in contact therewith; a gaseous coolant in contact with said covering layer; and a cylindrical filler member coaxial with said core member and spaced from the internal wall surface thereof, said core member and said filler member defining an annular gap therebetween for the circulation of a purge gas.

References Cited by the Examiner

UNITED STATES PATENTS

| | | | |
|---|---|---|---|
| 2,990,351 | 6/1961 | Sanz et al. | 176—71 |
| 2,992,172 | 7/1961 | Blainey et al. | 176—91 |
| 3,039,947 | 6/1962 | Fortescue et al. | 176—71 |
| 3,079,316 | 2/1963 | Johnson | 176—68 |
| 3,135,665 | 6/1964 | Koutz et al. | 176—71 |
| 3,170,847 | 2/1965 | Dudek et al. | 176—71 |

BENJAMIN R. PADGETT, *Primary Examiner.*

L. DEWAYNE RUTLEDGE, CARL D. QUARFORTH, *Examiners.*

J. V. MAY, M. J. SCOLNICK, *Assistant Examiners.*